United States Patent
Saxena et al.

(10) Patent No.: US 10,460,240 B2
(45) Date of Patent: Oct. 29, 2019

(54) APPARATUS AND METHOD FOR TAG MAPPING WITH INDUSTRIAL MACHINES

(71) Applicant: General Electric Company, Schenectady, NY (US)

(72) Inventors: Abhinav Saxena, San Ramon, CA (US); Charmin Patel, Lisle, IL (US); Shaddy Abado, Lisle, IL (US); Xiaohui Hu, Foxborough, MA (US); Achalesh Pandey, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 419 days.

(21) Appl. No.: 15/348,487

(22) Filed: Nov. 10, 2016

(65) Prior Publication Data

US 2018/0129714 A1 May 10, 2018

(51) Int. Cl.
| | |
|---|---|
| *G06F 17/00* | (2019.01) |
| *G06N 5/02* | (2006.01) |
| *G06F 16/25* | (2019.01) |
| *G05B 19/042* | (2006.01) |
| *G05B 19/418* | (2006.01) |
| *G05B 19/12* | (2006.01) |

(52) U.S. Cl.
CPC .......... *G06N 5/02* (2013.01); *G05B 19/0428* (2013.01); *G05B 19/41845* (2013.01); *G06F 16/258* (2019.01); *G05B 19/12* (2013.01); *G05B 2219/31166* (2013.01)

(58) Field of Classification Search
None
See application file for complete search history.

(56) References Cited

U.S. PATENT DOCUMENTS

| | | | |
|---|---|---|---|
| 2006/0259475 A1* | 11/2006 | Dehlinger | G06F 16/907 |
| 2009/0303013 A1* | 12/2009 | Edgerton | G06K 7/0008 340/10.1 |
| 2015/0130480 A1* | 5/2015 | Berkcan | H04Q 9/00 324/633 |

* cited by examiner

*Primary Examiner* — Anhtai V Tran
(74) *Attorney, Agent, or Firm* — Fitch Even Tabin & Flannery LLP

(57) ABSTRACT

A system and method for associating equipment sensor tags with tags associated with analytic programs including embodiments that receive a list of equipment tag names and corresponding descriptions as well as a list of analytic tag names and descriptions. The equipment tag descriptions are normalized to create normalized equipment tag descriptions, and the analytic tag descriptions are normalized to create normalized analytic tag descriptions. A first matrix of vectors that associates content in a dictionary with aspects of the equipment tag names is created using corresponding normalized tag descriptions. A second matrix of vectors that associates the content in a dictionary with aspects of the normalized analytic tag description is created.

18 Claims, 11 Drawing Sheets

OUTPUTS

Augmented Equipment Tag List — 150
- Inferred missing units
- Association to an asset type
- Augmented tag descriptions

| Equipment Tag | Equipment Tag Description | Equipment Unit | Asset Type |
|---|---|---|---|
| G1_DWATTMNA.XQ01 | | AMPS | Gas Turbine 1, Gas Turbine Generator 1 |
| 1SCR2T4300.XQ01 | AQUEOUS AMMON FLO CV POSITION | % | HRSG 1 |
| G1_BTTA1_14.XQ01 | BRG METAL TMP-THRUST ACT TEMPERATURE | ?F | Gas Turbine 1, Gas Turbine Generator 1 |
| G2_atdb.XQ01 | Ambient Dry Bulb TEMPERATURE | ?F | Gas Turbine 2, Gas Turbine Generator 2 |
| STG-TE-3465.XQ01 | THRUST BRG MTL TMP F-L TEMPERATURE | Fahrenheit | Steam Turbine |

Augmented Analytic Tag List — 152
- Analytic Tag description if missing
- Inferred missing units
- Augmented tag descriptions
- Similarity threshold to specify tag importance for mapping

| Asset Name | Analytic Tag | Analytic Tag Description | Analytic Units | Sim Threshold |
|---|---|---|---|---|
| Gas Turbine Generator 1 | AVERAGE_CURRENT | Average current | Amps | 0.06 |
| HRSG 1 | AMMONIA_SLIP | Ammonia slip | None | 0.45 |
| Gas Turbine 1 | ACTIVE_THRUST_BRG_MTL_TEMP_1 | Active thrust bearing metal temperature 1 | Fahrenheit | 0.1 |
| Gas Turbine 2 | AMBIENT_TEMP | Ambient temperature 1 | Fahrenheit | 0.1 |
| Steam Turbine | ACTIVE_THRUST_BRG_MTL_TEMP_1 | Active thrust bearing metal temperature 1 | Fahrenheit | 0.1 |
| HRSG 2 | AMMONIA_FLOW | Ammonia flow | LBMPerHour | 0.35 |
| Steam Turbine | BRG_2_VIB_1_OVERALL | Bearing 2 vibration 1 overall length | mils | 0.2 |

Updated Domain Rule-base — 144

| description | pattern | measType | assetType | customDescr |
|---|---|---|---|---|
| tag begins with 1 | ^1\s | | Gas Turbine | |
| tag begins with 2 | ^2\s | | Steam Turbine | |
| tag has TE | \sTE\s | Temperature | | |
| tag has PT | \sPT\s | Pressure | | |
| tag has FT | \sFT\s | Flow | | |

*FIG. 4B*

INPUTS

150 — Augmented Equipment Tag List
Includes at least -
- Equipment Tag (unique Sensor ID)
- Tag Description
- Unit of measurement
- Number of Equipment tags: $m$

| Equipment Tag | Equipment Tag Description | Equipment Unit | Asset Type |
|---|---|---|---|
| G1_DWATTM456A.XQ01 | | AMPS | Gas Turbine 1, Gas Turbine Generator 1 |
| HSGFL49C0.XQ01 | AQUEOUS AMMON FLO CV POSITION | % | HRSG 1 |
| G1_BTTA1_14.XQ01 | BRG METAL TMP THRUST ACT TEMPERATURE | °F | Gas Turbine 1, Gas Turbine Generator 1 |
| G2_st6b.XQ01 | Ambient Dry Bulb TEMPERATURE | °F | Gas Turbine 2, Gas Turbine Generator 2 |
| STG-TE-3465.XQ01 | THRUST BRG MTL TMP FL TEMPERATURE | Fahrenheit | Steam Turbine |

152 — Augmented Analytic Tag List
Includes at least -
- Analytic Tag (Analytic Input ID)
- Analytic Tag Description (optional)
- Analytic Unit of measurement
- Asset Name
- Number of Analytic tags: $n$

| Asset Name | Analytic Tag | Analytic Tag Description | Analytic Units | Sim Threshold |
|---|---|---|---|---|
| Gas Turbine Generator 1 | AVERAGE_CURRENT | Average current | Amps | 0.06 |
| HRSG 1 | AMMONIA_SLIP | Ammonia slip | None | 0.45 |
| Gas Turbine 1 | ACTIVE_THRUST_BRG_MTL_TEMP_1 | Active thrust bearing metal temperature 1 | Fahrenheit | 0.1 |
| Gas Turbine 2 | AMBIENT_TEMP | ambient temperature | Fahrenheit | 0.1 |
| Steam Turbine | ACTIVE_THRUST_BRG_MTL_TEMP_3 | Active thrust bearing metal temperature 1 | Fahrenheit | 0.1 |
| HRSG 2 | AMMONIA_FLOW | Ammonia flow | lb/hr/hour | 0.35 |
| Steam Turbine | BRG_2_VIB_1_OVERALL | Bearing 2 vibration 1 overall length | mils | 0.2 |

142 — Domain Dictionary

---

2.1 Document-Term-Frequency Matrix Calculation
Applied to both Equipment tags and Analytic tags

Data Normalization (502)
- Remove special characters, stop words
- Normalize all terms by domain dictionary
- Total number of unique terms in descriptions - $p$

DTF Matrix Created (504)
- Generate $n$-grams ($n = 1, 2, ...$)
- Create Equipment DTF for Equipment tags, size: $m \times p$
- Create Analytic DTF for Analytic Tags, size: $n \times p$

---

OUTPUTS — 160

Equipment DTF matrix ($m \times p$)

| | Term 1 | Term 2 | Term 3 | ... | Term $p$ |
|---|---|---|---|---|---|
| E Tag 1 | 0 | 0 | 1 | | 0 |
| E Tag 2 | 0 | 0 | 0 | | 1 |
| E Tag $m$ | 1 | 1 | 0 | | 2 |

Analytic DTF matrix ($m \times p$) — 162

| | Term 1 | Term 2 | Term 3 | ... | Term $p$ |
|---|---|---|---|---|---|
| A Tag 1 | 1 | 0 | 0 | | 0 |
| A Tag 2 | 1 | 1 | 1 | | 0 |
| A Tag $n$ | 1 | 1 | 0 | | 0 |

*FIG. 5*

INPUTS

160 — Equipment DTF matrix (mxp)

|       | Term 1 | Term 2 | Term 3 | . | . | Term p |
|-------|--------|--------|--------|---|---|--------|
| E Tag 1 | 0 | 0 | 0 |   |   | 0 |
| E Tag 2 | 0 | 1 | 1 |   |   | 1 |
| ...   |   |   |   |   |   |   |
| E Tag m | 1 | 0 | 1 |   |   | 1 |

162 — Analytic DTF matrix (nxp)

|       | Term 1 | Term 2 | Term 3 | . | . | Term p |
|-------|--------|--------|--------|---|---|--------|
| A Tag 1 | 1 | 0 | 0 |   |   | 0 |
| A Tag 2 | 1 | 1 | 0 |   |   | 1 |
| ...   |   |   |   |   |   |   |
| A Tag n | 0 | 0 | 1 |   |   |   |

150 — Equipment Tag Unit Type (mx1) / Equipment Tag Asset Name (mx1)

| Asset Name | Unit Type |
|---|---|
| Steam Turbine | Temperature |
| Gas Turbine 1, Gas Turbine Generator 1 | Temperature |
| HRSG 1 | Position |
| HRSG 2 | Flow |
| Gas Turbine 2, Gas Turbine Generator 2 | Temperature |
| Gas Turbine 1, Gas Turbine Generator 1 | Current |

152 — Analytic Tag Unit Type (nx1) / Analytic Tag Asset Name (nx1)

| Asset Name | Unit Type |
|---|---|
| Gas Turbine Generator 1 | Current |
| HRSG 1 | None |
| Gas Turbine 1 | Temperature |
| Gas Turbine 2 | Temperature |
| Steam Turbine | Temperature |
| HRSG 2 | Flow |
| Steam Turbine | Length |

---

(602) Description Similarity Matrix $D(n \times m)$
Applied to both Equipment tags and Analytic tags (604) Units Similarity Matrix $U(n \times m)$
Applied to both Equipment tags and Analytic tags (606) Asset Similarity Matrix $A(n \times m)$
Applied to both Equipment tags and Analytic tags (608) Semantic Similarity Matrix $S(n \times m)$
Applied to both Equipment tags and Analytic tags (610) Data Similarity Matrix $P(n \times m)$
Applied to both Equipment tags and Analytic tags

⋮

(612) Composite Similarity Calculation
$C(n \times m) = D \odot U \odot A \odot S \odot P$
Applied to both Equipment tags and Analytic tags

---

OUTPUTS

170 — Composite Similarity Matrix (nxm)

|         | E Tag 1 | E Tag 2 | E Tag 3 | ... | E Tag m |
|---------|---------|---------|---------|-----|---------|
| A Tag 1 | 0.02 | 0.32 | 0.78 |   | 0.33 |
| A Tag 2 | 0.88 | 0.51 | 0.22 |   | 0.34 |
| ...     |      |      |      |   |      |
| A Tag n | 0.1  | 0.33 | 0.23 |   | 0.1  |

*FIG. 6*

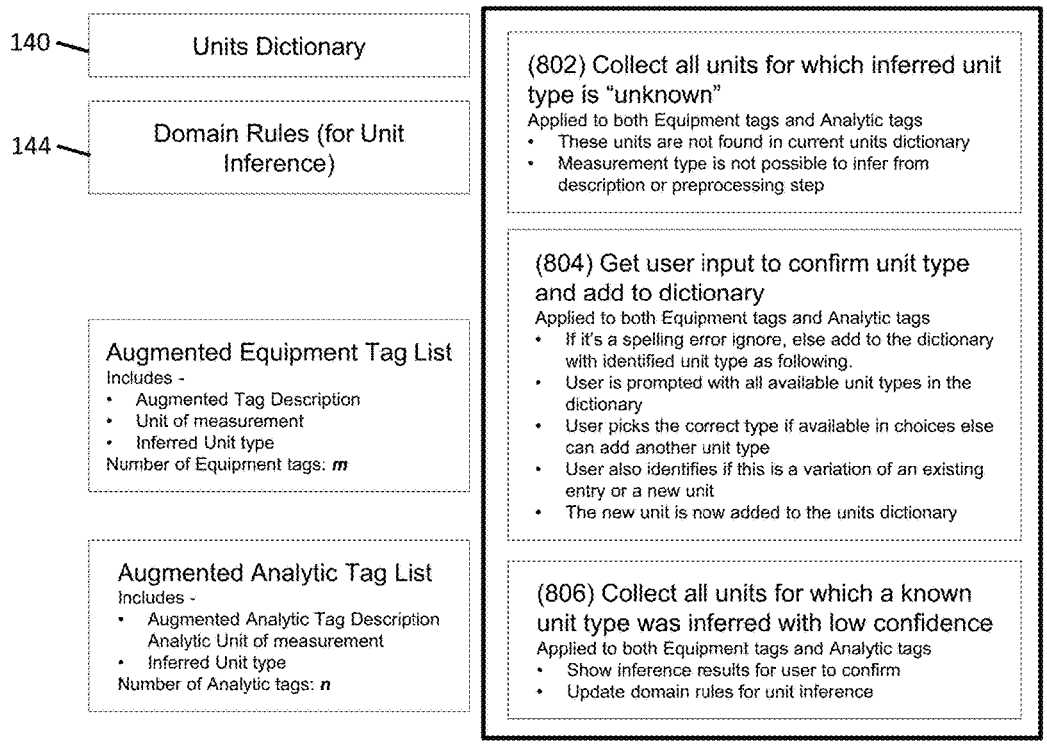
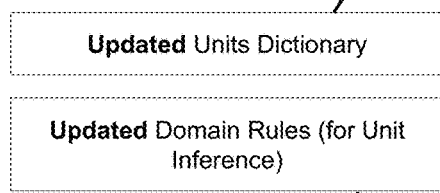
FIG. 8

APPARATUS AND METHOD FOR TAG MAPPING WITH INDUSTRIAL MACHINES

BACKGROUND OF THE INVENTION

Field of the Invention

The subject matter disclosed herein generally relates to sensors deployed at machines (e.g., industrial machines) and, more specifically, to the names associated with these sensors.

Brief Description of the Related Art

Various types of industrial machines are used to perform various manufacturing operations and tasks. Other machines can be used for other tasks, e.g., power generation. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). Typically, industrial machines are controlled at least in part by computer code (or a computer program) that is executed by a processor located at the machine.

The industrial machines typically have sensors (or "tags") associated with them. The sensors typically measure various physical qualities such as temperature and pressure. The measured values may relate to the operation of the machine or characteristics of the product/process created by the machine.

Analytic programs ("analytics") take the information from the sensors and utilize this information in various ways. For example, analytics may determine how efficiently a machine is operating or the state of the machine. Analytics need to identify the tags having the information they will utilize in order to perform their analysis. To accomplish this purpose, the tags on the machines are assigned names and this is typically done by a human user. Once named, the tag names on the machine can be mapped to tag names used by the analytics. Thus, needed information can be passed from a given tag on a machine to a particular analytic and utilized.

Current approaches rely upon the manual mapping of tag names (of customer machines) to tag names (used by analytics). Unfortunately, in modern industrial settings, there can be thousands (or tens of thousands) of tag names making the mapping process time-consuming, costly, and prone to human error. Additionally, different users may also name tags according to different naming conventions adding to the amount of time for performing the mapping process. All of these problems have led to user dissatisfaction with current approaches.

BRIEF DESCRIPTION OF THE INVENTION

The present invention is directed to an improved approach to mapping tags names to analytics to facilitate the use of analytic programs with the machine or equipment containing the tags. In some embodiments, the invention described herein may map tag names to analytic programs. Embodiments disclosed herein may further facilitate the mapping process through the use of machine learning techniques, text and asset analytics and the automated use of subject matter knowledgebases. All or part of the invention herein may optionally be implemented using a computerized industrial internet of things analytics platform that may be deployed at the location of the manufacturing process, at the manufacturing facility premise or in the cloud. The invention can also be deployed on local servers or local networks. Therefore, the invention disclosed therein facilitates the use of analytics to collect and analyze tag data and improve the operations of the machines containing the tags.

In many of these embodiments, a list of equipment tag names and corresponding descriptions is received. Each of the equipment tag names is associated with one of a plurality of sensors associated with one or more industrial devices. A list of analytic tag names and descriptions is also obtained. Each of the analytic tag names is used by an analytic and associated with one or more of the plurality of sensors in the one or more industrial devices. The descriptions may be a separate description for a tag, may be the same as the name, or may include both the name and further description.

The equipment tag descriptions are normalized to create normalized equipment tag descriptions, and the analytic tag descriptions are normalized to create normalized analytic tag descriptions. A first matrix of vectors (e.g., binary vectors) that associates terms in a dictionary with aspects of the equipment tag names is created using corresponding normalized tag descriptions. The dictionary is a collection of terms used in describing an industrial equipment and processes. The dictionary may be domain specific structure (and referred to herein as a domain dictionary) that is tied to a specific domain (e.g., a dictionary associated with a transportation domain, or a dictionary associated with a power generation domain to mention two examples). A second matrix of vectors (e.g., binary vectors) that associates the terms in a dictionary with aspects of the normalized analytic tag description is created.

Each of the vectors in the second matrix is compared to each vector in the first matrix to obtain a similarity measure between each normalized analytic tag description and each normalized equipment tag description, hence providing a similarity between analytic tag names and equipment tag names. A determination is made as to whether to associate a normalized equipment tag name to an input of an analytic computer program based at least in part upon the comparison.

In aspects, a ranked list of equipment tag names (ordered according to the similarity measures) is presented to a user. In other examples, a second similarity measure between a parameter associated with each normalized analytic tag name and each normalized equipment tag name is determined. The parameter may relate to a measurement unit or one or more attributes of measurement data associated with a tag. In examples, the similarity measure and the second similarity measure are multiplied and/or added to obtain an overall similarity measure. Additional similarity measures can also be used.

Normalizing the equipment or analytic tag descriptions may include automatically examining the syntax of the corresponding equipment tag names or accepting user input regarding the equipment tag names. In examples, the similarity measures obtained by the mapping are stored in a third matrix. In some examples, the dictionary is part of a knowledge base, and portions of the knowledgebase are learning from the latest mapping and human input.

In others of these embodiments, an apparatus includes an interface, a database (or knowledgebase), and a control circuit. The interface has an input and an output. The input is configured to receive a list of equipment tag names and corresponding descriptions. Each of the equipment tag names is associated with one of a plurality of sensors associated with one or more industrial devices. The input is configured to receive a list of analytic tag names and analytic tag descriptions. If analytic tag descriptions are not provided they are inferred from analytic tag names automatically.

Each of the analytic tag names is associated with one or more of the plurality of sensors in the one or more industrial devices.

The database (or knowledgebase) includes a domain term dictionary. The control circuit is coupled to the interface and the database. The control circuit is configured to normalize the equipment tag descriptions to create normalized equipment tag descriptions, and to normalize the analytic tag descriptions to create normalized analytic tag descriptions. The control circuit is configured to create a first matrix of vectors that associates terms in the dictionary with aspects of the normalized equipment tag descriptions, and to create a second matrix of vectors that associates the terms in the dictionary with aspects of the normalized analytic tag descriptions. The control circuit is configured to compare each of the vectors in the second matrix to each vector in the first matrix to obtain a similarity measure between each normalized analytic tag description and each normalized equipment tag description to establish similarity between corresponding analytic tag names and equipment tag names (a proposed mapping). The control circuit is configured to present the proposed mapping to a user in order to determine whether to associate a normalized equipment tag name to an input of an analytic computer program.

In aspects, the first matrix and the second matrix also associate terms not in the dictionary with the tag names. In examples, the control circuit is configured to selectively update the dictionary.

In some examples, the control circuit is configured to present to a user a ranked list of equipment tag names ordered according to the similarity measures at the output. In other examples, the control circuit is configured to obtain a second similarity measure between a parameter associated with each normalized analytic tag name and each normalized equipment tag name. In some aspects, the parameter relates to a measurement unit or one or more attributes of measurement data associated with a tag.

In other examples, the control circuit is configured to multiply or add the similarity measure and the second similarity measure to obtain an overall similarity measure. Additional similarity measures can be used.

In examples, the normalized equipment tag descriptions are obtained by automatically examining the syntax of equipment tag names and identifying any relevant information about plant configuration automatically or by accepting user input regarding the equipment tag names. In other examples, normalized analytic tag descriptions are obtained by automatically examining the syntax of the analytic tag names or any metadata available about description of analytic itself, such as function of the analytic or applicability of analytic to one or more equipment types.

BRIEF DESCRIPTION OF THE DRAWINGS

For a more complete understanding of the disclosure, reference should be made to the following detailed description and accompanying drawings wherein:

FIGS. 4A and 4B comprise a block diagram of one example of an automated pre-processing (data cleanup and augmentation) approach according to various embodiments of the present invention;

FIG. 5 comprises a block diagram of one example of data normalization and transformation (into matrix representation) to both equipment and analytic tags according to various embodiments of the present invention;

FIG. 6 comprises a block diagram of one example of how similarity calculations are performed according to various embodiments of the present invention;

FIG. 8 comprises a block diagram of an approach for expanding the units database according to various embodiments of the present invention;

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

As used herein, "equipment tag name" means the name of a tag or sensor on or at an industrial machine. As used herein, "analytic tag name" means a name of a tag or sensor as used by an analytic computer program. The approaches described herein advantageously map equipment tag names (typically supplied by a customer or a user of the industrial machines) to analytic tag names. The analytic tag names are used by an analytic. A learning process may also be performed, whereby knowledge obtained during the mapping phase is used to improve performance of future mappings.

In the mapping phase, these approaches leverage all domain information available at a given time to recommend best equipment tags to tags associated with a given analytic tag. These approaches may be used in batch mode to process a large number of analytic tags simultaneously. For cases where the mapping is uncertain, this uncertainty can be communicated to a human user so that the user can manually map such tags using an interactive interface. In examples, a final output showing all analytic tags mapped (with a high degree of confidence) to analytic tags can be rendered to a user.

Various databases (or knowledgebases) store information used in the mapping process. For example, a units database stores information about the measurement units for tags, while a domain dictionary stores information concerning the terms used in tag names. In the learning phase, the final output is used (along with the past mappings) to improve and/or update various knowledge databases. In one example, a units dictionary is expanded to include new units if new (previously unseen) measurement units were found to be used in an equipment tag list from a customer site. In another example, the domain dictionary is expanded to include new terms (or new variations of existing terms from the equipment tag list from a customer site). In yet another example, a record of past mapping statistics for analytic tags is updated.

Figure 1A:
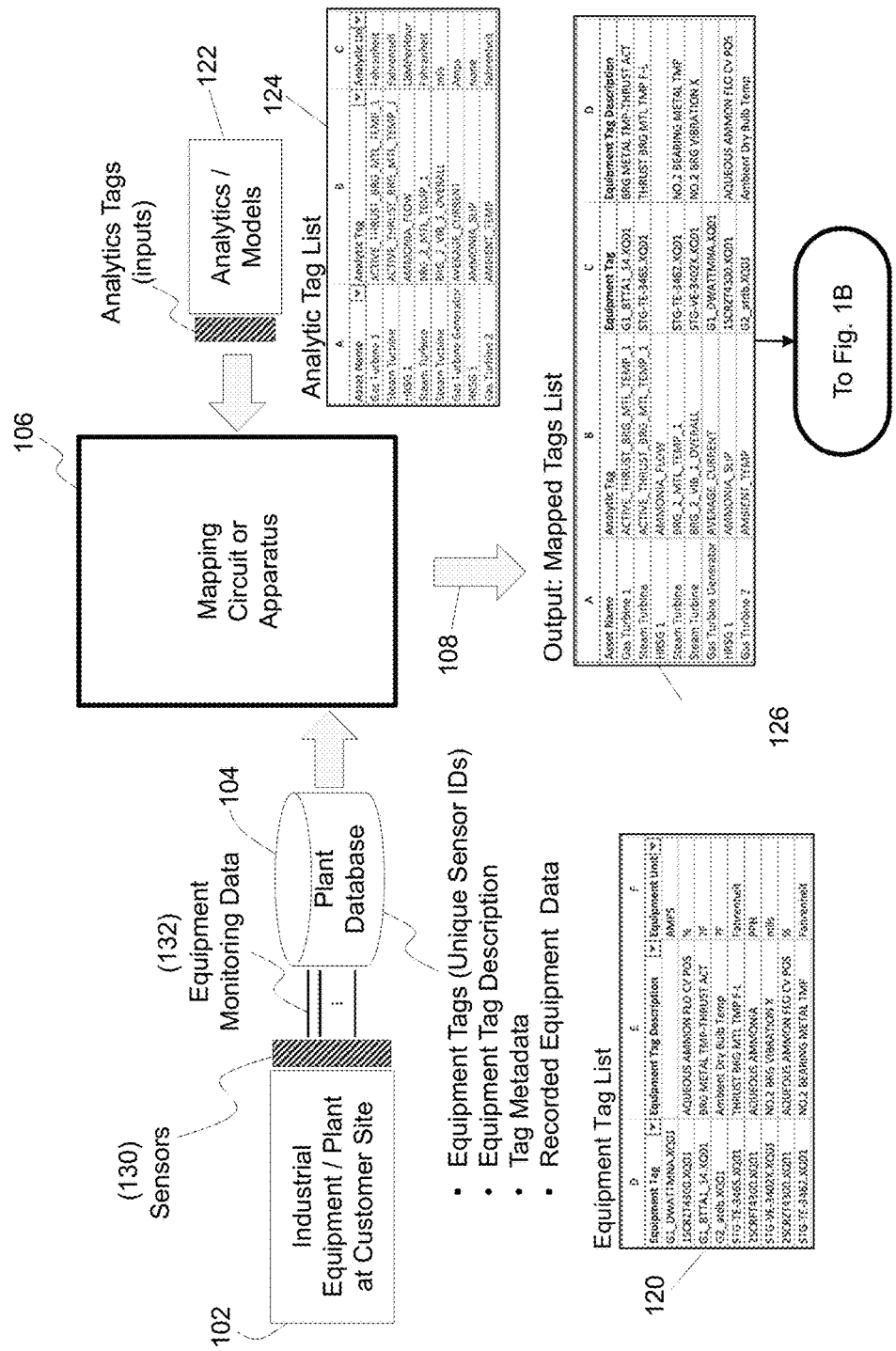
FIGS. 1A and 1B comprise a block diagram of a system for tag mapping according to various embodiments of the present invention.
Figure 1B:
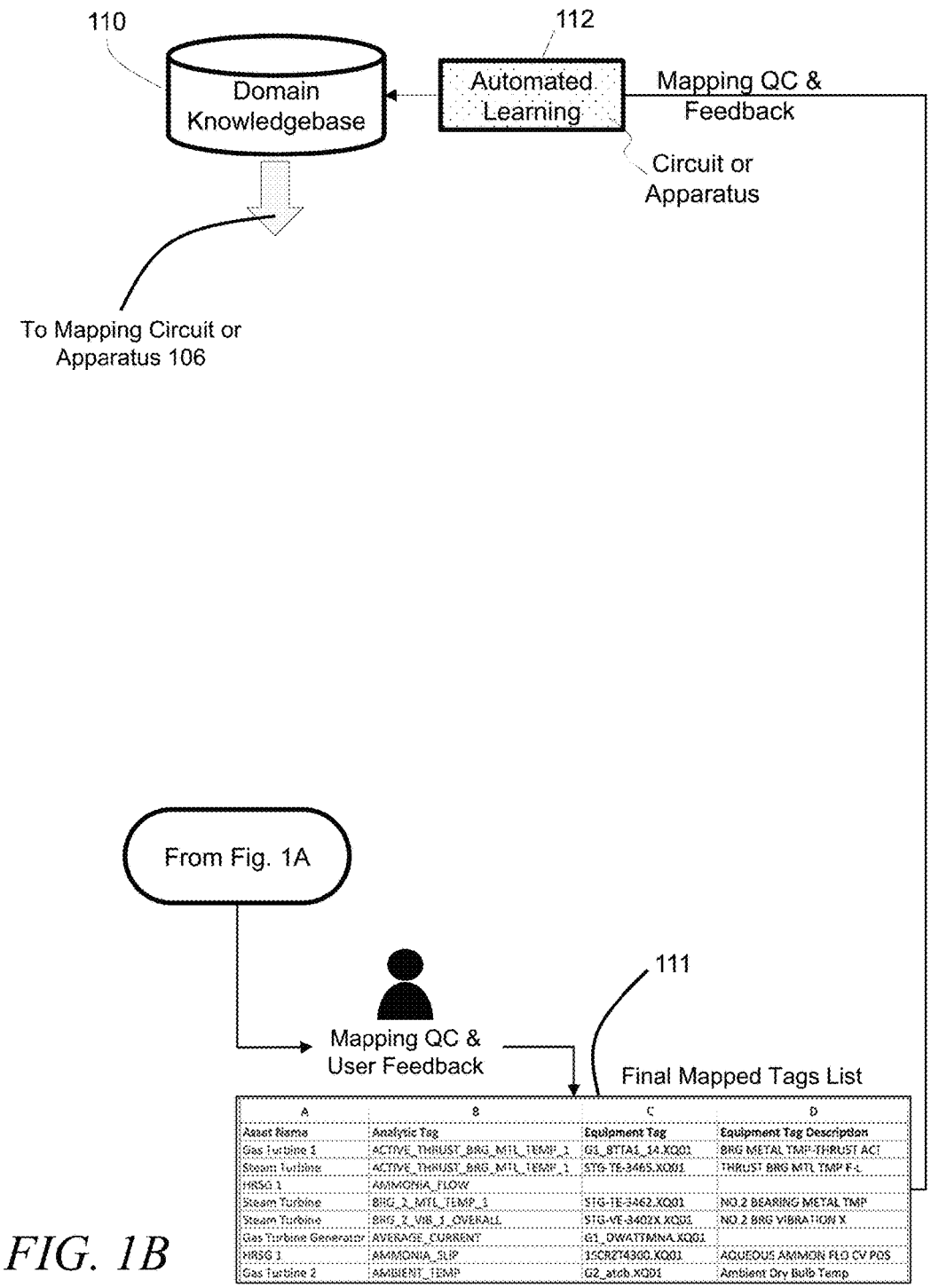

Referring now to FIG. 1, one example of a system for tag mapping is described. The system includes industrial equipment 102 (at a customer site), a plant database 104, and a mapping apparatus or circuit 106. The mapping apparatus 106 produces an output 108. The mapping apparatus 106 receives an equipment tag list 120 from the industrial equipment 102 or plant database 104, information from a domain knowledge database 110, and analytics/model information 122 including an analytic tag list 124. The output 108 is a mapped tags list 126. The list 126 may be presented to a user and is also used by an automated learning apparatus or circuit 112.

The plant database 104 and domain knowledge database 110 are any type of memory storage devices. The plant database 104 includes equipment tag names, equipment tag descriptions, tag metadata, and recorded equipment data. The domain knowledge database 110 includes a domain dictionary, which includes terms included in tag names. The domain knowledge database 110 may also include a units dictionary including measurement units (e.g., degrees Fahrenheit, degrees Celsius, to mention two examples). The analytics/model information 122 (including the analytic tag list 124) may be stored in another data storage device.

The industrial equipment 102 may include one or more industrial machines at any location (e.g., a power plant, factory, or locomotive to mention a few examples) and includes sensors (tags) 130. The sensors 130 measure or sense a wide variety of information. For example, the sensors 130 may measure temperature, pressure, or other types of information. In aspects, the sensors 130 produce equipment monitoring data 132, which is stored at the plant database 104. The data 132 may be time series data, snapshot data, log data, or data from control inputs to mention a few examples. The equipment tag list 126 is also stored at the plant database 104 and includes an equipment tag name, a description, and a measurement (equipment) unit. This information may be entered by a human user. The data 132 is sent to analytics/models 122 where analytics may be run on the data. The analytics/models 122 include any computer program that analyzes data. Before data 132 can be consumed by the analytics 122, correct mapping is established by mapping apparatus 106.

The analytic tag list 124 includes an asset name, an analytic tag (name), the measurement unit, and optionally analytic tag description. The mapping apparatus 106 maps equipment tag names to analytic tag names and shows the mapping in the mapped tags list 126. For cases where the mapping is uncertain, this uncertainty can be communicated to a human user so that the user can manually map such tags using an interactive interface. The interface may be at any type of device such as a personal computer, tablet, or smart phone. Other examples are possible. The final mapping can be processed by an automated learning apparatus 112 and used to update the domain knowledge database 110.

In one example of the operation of FIG. 1, the equipment tag list 120 is received by the mapping apparatus 106. Each of the equipment tag names in the list 120 is associated with one of a plurality of sensors associated with one or more industrial devices. The analytic tag list 124 is obtained. Each of the analytic tag names in the list 124 is used by an analytic 122 and associated with one or more of the plurality of sensors 132 in the one or more industrial devices 130.

The equipment tag descriptions (second column) in list 120 are normalized to create normalized equipment tag descriptions, and the analytic tag descriptions (second column) in the list 124 are normalized to create normalized analytic tag descriptions. It will be understood that the descriptions may be a separate description (i.e., separate from the name), the same as the name, or include both the name and further description. In the examples shown in the figures, the tag name is in the first column of a list, the tag description is in the second column of a list, and the units are in the third column of a list. Where analytic tag descriptions are not available from analytic tag list 124, they are inferred from analytic tag names in step 404. A first matrix of vectors (e.g., binary vectors) that associates terms in a domain dictionary stored in database 110 with aspects of the normalized equipment tag descriptions is created. A second matrix of vectors (e.g., binary vectors) that associates the terms in the domain dictionary stored in the database 110 with aspects of the normalized analytic tag descriptions is created.

Each of the vectors in the second matrix is compared to each vector in the first matrix to obtain a similarity measure between each normalized analytic tag description and each normalized equipment tag description, thereby also establishing similarity between corresponding analytic tag names and equipment tag names. A determination is made as to whether to associate a normalized equipment tag name to an input of an analytic computer program based at least in part upon the mapping.

In aspects, a ranked list of equipment tag names (ordered according to the similarity measures) is presented to a user. In one example, the ranked list is the mapped tag list 126. In other examples, a second similarity measure between a parameter associated with each normalized analytic tag name and each normalized equipment tag name is determined. The parameter may relate to a measurement unit or one or more attributes of measurement data associated with a tag. In some examples, the similarity measure and the second similarity measure are multiplied and/or added to obtain an overall similarity measure.

Normalizing the equipment or analytic tag descriptions may include automatically examining the syntax of the equipment tag names or accepting user input regarding the equipment tag names. In examples, the similarity measures obtained by the mapping are stored in a third matrix.

Humans may provide user feedback to create a final mapped tags list 111. The automated learning apparatus 112 receives the list 111 and is configured to improve aspects of the database 110 so future mappings will be more accurate. In one example, the units dictionary in the database 110 is expanded to include new units if new (previously unseen) measurement units were found to be used in an equipment tag list from a customer site. In another example, the domain dictionary in the database 110 is expanded to include new terms (or new variations of existing terms from the equipment tag list from a customer site).

Figure 2:
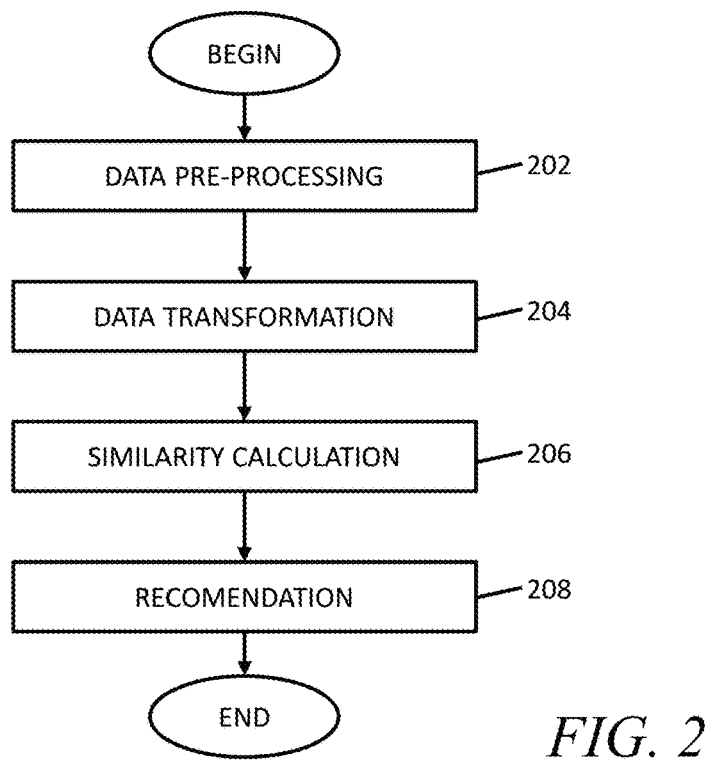
FIG. 2 comprises a flowchart of one example of a mapping process according to various embodiments of the present invention.

Referring now to FIG. 2, one example of a mapping process is described. At step 202, data pre-processing is performed. This step may include data cleanup, data augmentation and/or normalization, the creation of domain rules, and the application of these rules.

At step 204, data transformation is performed. For example, a first matrix of vectors (e.g., binary vectors) that associates terms in a dictionary with aspects of the normalized equipment tag descriptions is created. A second matrix of vectors (e.g., binary vectors) that associates the terms in a dictionary with aspects of the normalized analytic tag descriptions is created.

At step 206, a similarity calculation is performed. For example, each of the vectors in the second matrix is compared to each vector in the first matrix to obtain a similarity measure between each normalized analytic tag description and each normalized equipment tag description, thereby establishing similarity between corresponding analytic tag names and equipment tag names.

At step 208, a recommendation is formed. More specifically, a determination is made as to whether to associate a normalized equipment tag name to an input of an analytic computer program based at least in part upon the mapping. In aspects, a ranked list of equipment tag names ordered according to the similarity measures is presented to a user.

In other examples, a second similarity measure between a parameter associated with each normalized analytic tag name and each normalized equipment tag name is determined. The parameter may relate to a measurement unit or one or more attributes of measurement data associated with a tag. In some examples, the similarity measure and the second similarity measure are multiplied and/or added to obtain an overall similarity measure.

Figure 3:
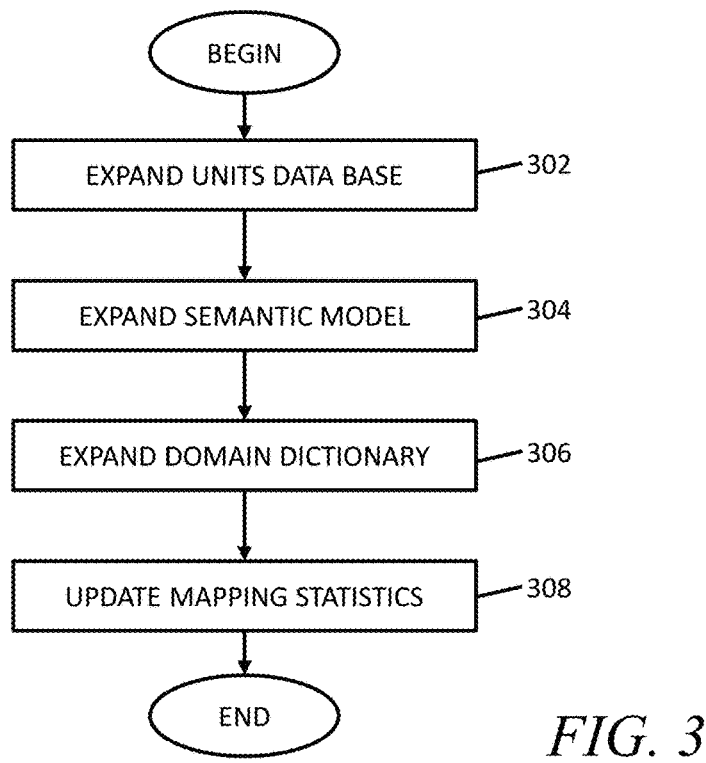
FIG. 3 comprises a flowchart of one example of a learning process according to various embodiments of the present invention.

Referring now to FIG. 3, one example of a learning process is described. At step 302, the units database (or dictionary) is expanded. For example, when new and previously unseen measurement units are found, these may be added to the units database.

At step 304, the semantic model (which is used for obtaining yet another similarity matrix) is updated or expanded. A semantic model learns contextual associations (using existing machine learning algorithms) between terms in domain dictionary through a vector representation of words, which can be used to establish semantic similarity between an analytic tag description and an equipment tag description. One or more semantic models may be created for various different domains and stored as a semantic model library. At step 306, the domain dictionary is expanded or updated. For example, new terms are included (or new variations of old terms are included). At step 308, the mapping statistics are updated.

Figure 4A:
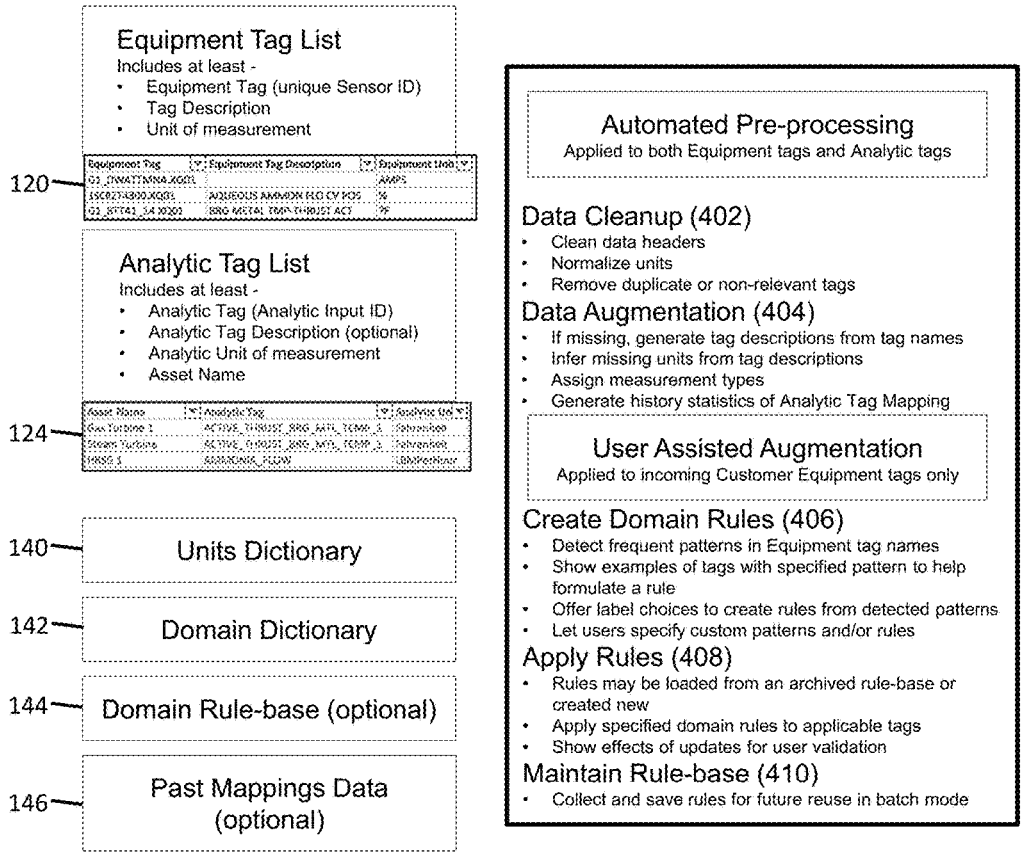

Referring now to FIG. 4, one example of an automated pre-processing (e.g., including data clean up and augmentation) approach is described. It will be understood that steps 402 and 404 may be performed on both analytic and equipment tag information, while steps 406, 408, and 410 are applied to equipment tag information only. The equipment tag list 120 and analytic tag list 124 are input to the algorithm of FIG. 4. Other inputs include a units dictionary 140 (storing measurement unit values of units that are known), a domain dictionary (storing names and phrases that are known from tag names), a domain rule base (if available) 144 (showing rules used to assist in interpreting a tag name), and past mappings data (if available) 146 (showing past mapping decisions and reasoning).

At step 402, data clean-up is performed. For example, data headers are cleaned. Units may be normalized. Duplicate or non-relevant tag names may also be removed.

At step 404, data augmentation (e.g., an automated process) is performed. If a tag description is missing, the description is inferred from tag name itself. In some aspects, missing units may be inferred from tag descriptions. Measurement types may be assigned. History statistics of analytic tag mappings may also be generated. The result is an equipment tag list with augmented information 150 and an analytic tag list with augmented information 152.

At step 406, domain rules are created. For example, frequent patterns in equipment tag names may be detected. In another example, examples of tags with patterns are shown to a user to help the user formulate a rule. In yet another example, the user may be offered label choices to create rules from specified patterns. In still another example, user input allows a user to specify custom patterns and/or rules.

At step 408, the rules are applied to the equipment tag list. For instance, the rules may be uploaded from an archive rule database 144. In aspects, the rules are applied to applicable tags. In other aspects, the effects of the application of the rules may be shown to a user and the user may be allowed to validate the rules.

At step 410, the rule database is maintained. The rules are collected and saved for future use, for instance in batch mode, or are added to the archived rule database 144. The result is an updated domain rule base 144.

Referring now to FIG. 5, one example of data transformation (or further normalization) to both equipment and analytic tag lists is described. Inputs include the augmented equipment tag list 150 and the augmented analytic tag list 152.

At step 502, data normalization is performed. In this step, special characters or words are removed. Terms in the tag name are normalized by using the domain dictionary. The total number of unique terms in the descriptions is approximately p.

At step 504, an equipment document term frequency (DTF) matrix 160 and an analytic DTF matrix 162 are created. M vectors (M=1, 2 . . . ) for the matrix 160 are generated, while N vectors (rows) (N=1, 2 . . . ) for the matrix 162 are generated. Each matrix has p columns. Each entry may be a binary value indicating if a particular tag name has a particular term. Other matrices may include the equipment tag unit type matrix 150 and analytic tag unit type matrix 152 includes unit types mapped to asset names.

Referring now to FIG. 6, one example of how similarity calculations are performed is described. Inputs include equipment DTF matrix 160, analytic DTF matrix 162, equipment tag unit type matrix 150 and analytic tag unit type matrix 152.

At step 602, a first similarity is determined with the description matrix. Each of the vectors in the matrix 162 is compared to each vector in the matrix 160 to obtain a first similarity measure between each normalized analytic tag name and each normalized equipment tag name.

At step 604, a second similarity is determined with the units matrix. Each of the unit types in the matrix 152 is compared to each unit type in the matrix 150 to obtain a first similarity measure between units in the analytics tag list and each equipment tag list.

At step 606, a third similarity is determined, with the asset matrix. The asset type associated with each of the equipment tag in the matrix 152 is compared to asset type associated with each of the analytic tags in matrix 150 to obtain a similarity measure between asset types in the analytics tag list and each equipment tag list. Asset types for analytic tag names are provided in the analytic tag list 124 carried forward to 150 and asset types for equipment tag names are obtained in 152 by applying domain rules in step 408.

At step 608, a fourth similarity is determined using the semantic similarity model library 190. Each of the analytic tag descriptions in 152 is compared to each analytic tag description 150 using semantic similarity model library 190 to obtain a similarity measure 608 between each normalized analytic tag name and each normalized equipment tag name.

At step 610, a fifth similarity is determined by comparing attributes of measurement data associated with an equipment tag. Attributes of measurement data typically describe statistical characteristics such as mean, median, variance, or ranges of measurement values that can be used to determine whether an equipment tag data is similar to analytic tag data. A corresponding data similarity matrix 610 is created based on similarity of one or more attributes of measurement data.

At step 612, a composite similarity score is determined. The composite score is obtained by combining each score obtained in each step 602-608. Combining can include multiplying, dividing, subtracting, and/or adding scores. The result is a composite similarity matrix 170 that is n x m in dimensions. Each entry in matrix 170 indicates how similar a particular equipment tag is with a particular analytic tag, given one or more aspects of similarities described by steps such as in, but not limited to, steps 602-608. A higher score may indicate more similarity, while a lower score may indicate less similarity.

Figure 7:
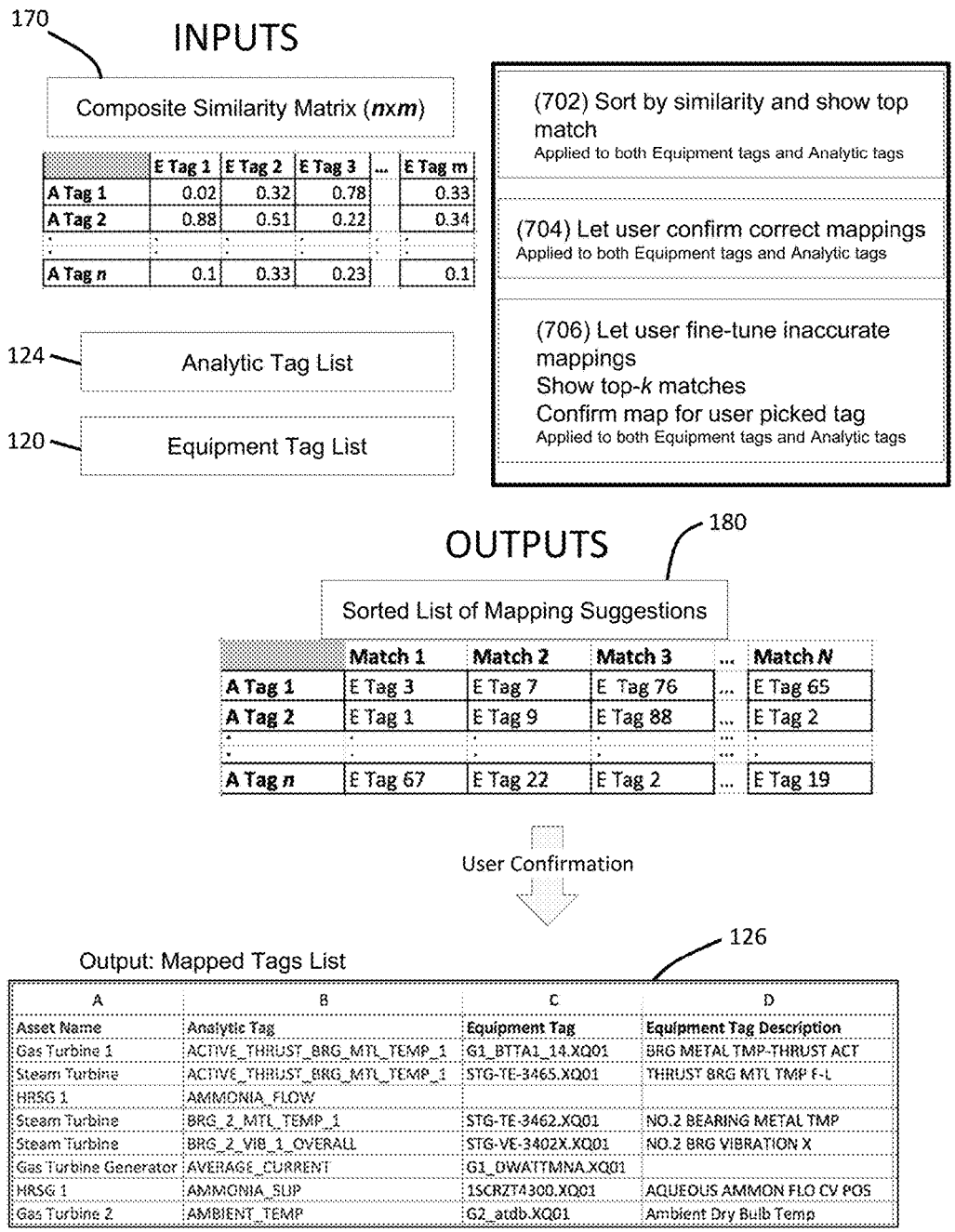
FIG. 7 comprises a block diagram of an approach for making recommendations according to various embodiments of the present invention.

Referring now to FIG. 7, one example of making recommendations is described. Inputs include the composite similarity matrix 170, the analytic tag list 124, and the equipment tag list 120.

At step 702, the composite similarity matrix may be sorted by similarity to show the top matches. This step creates a sorted list of mapping suggestions 180.

At step 704, a human user may be invited to confirm the correct mappings in the list of mapping suggestions 180. At step 706, a user may be allowed to fine-tune inaccurate mappings in the list 180. Once confirmed, the mapped tag list 126 is finalized and may be presented to a user.

Referring now to FIG. 8, one example of an approach for expanding the units database is described. Inputs include the units dictionary 140, domain rules 144 (including rules for unit inference), the augmented equipment tag list 150, and the augmented analytic tag list 152.

At step 802, all units for which the inferred unit type is unknown are collected from both equipment tags and analytic tags. These are units that are not found in the current units dictionary, and when it is not possible by other steps to infer the units. These units are candidates for adding to units database with user assistance in step 804.

At step 804, user input is obtained to confirm the unit type and add to the dictionary. In aspects, spelling errors can be ignored. The unit is added to the dictionary after the user is prompted with all available unit types in the dictionary, the user picks the correct type, the user identifies if this is a variation of an existing type, and the new unit is added to the dictionary 140. This is applied to both equipment tags and analytic tags.

At step 806, all units for which a known unit type was inferred with a low confidence are collected. The results may be shown to a user for a user to confirm. The domain rules 144 for unit inference may also be updated. This is applied to both equipment tags and analytic tags.

Figure 9:
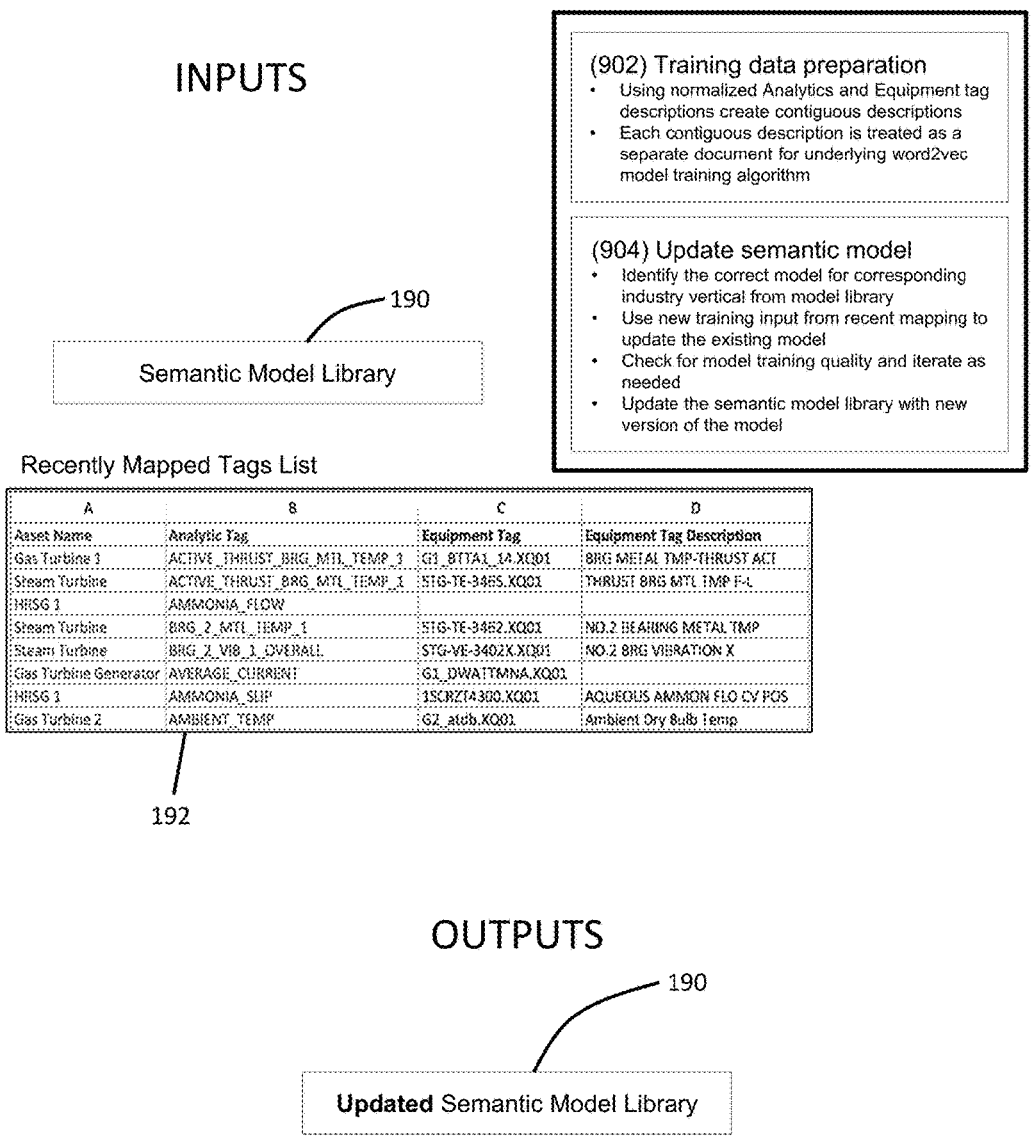
FIG. 9 comprises a block diagram of one approach for updating the semantic model library according to various embodiments of the present invention.

Referring now to FIG. 9, one approach for updating a semantic model library 190 is described. The semantic library model 190 is an input as is a recently mapped tags list 192. The semantic model library 190 includes semantic models for multiple domains, and the relevant domain-specific model is picked for the mapping step and the updating step. The semantic models learn contextual associations (using existing machine learning algorithms) between terms in domain dictionary through a vector representation of words, which can be used to establish semantic similarity between an analytic tag description and an equipment tag description).

At step 902, training data preparation is performed by creating contiguous descriptions of mapped analytic and equipment tag descriptions from the recently mapped tag list 192, henceforth referred to as a training document for an underlying training algorithm (e.g., a word2vec model training algorithm).

At step 904, the semantic model is updated. First the correct model is identified from the model library based on user input. New training input from a recent mapped tag list 192 is used to update the model. The model training quality can be checked and iterations performed as needed. Once model is updated, the corresponding sematic model library 190 can be updated with the updated model.

Figure 10:
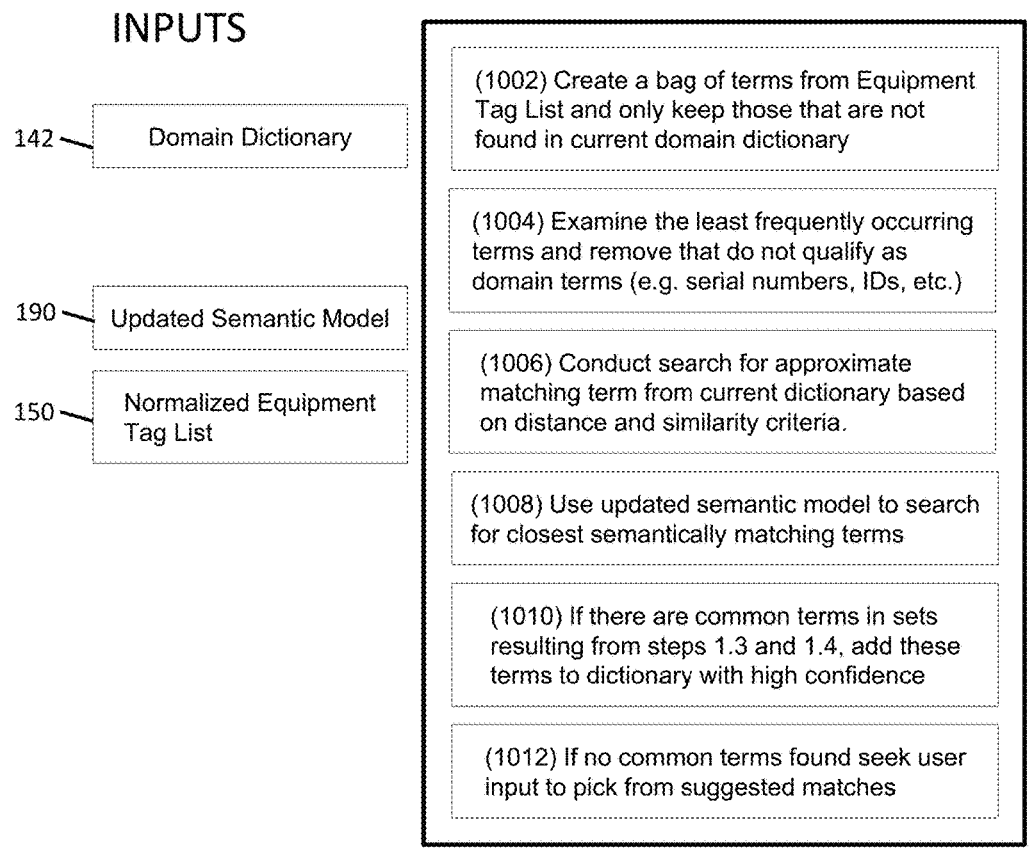
FIG. 10 comprises a block diagram of an approach for expanding the domain dictionary according to various embodiments of the present invention.

Referring now to FIG. 10, one example of an approach for expanding the domain dictionary is described. Inputs include the domain dictionary 142, the updated semantic model 190, and the normalized equipment tag list 150.

At step 1002, a grouping of terms is created from the equipment tag list 150 and only those not appearing in the current domain dictionary are kept. At step 1004, the least frequently occurring terms are examined, and those that do not qualify as domain terms (e.g., serial numbers, IDs, etc.) are removed.

At step 1006, a search is conducted for approximately matching terms from the current dictionary 142 based upon distance and similarity criteria. At step 1008, an updated semantic model 190 may be used to search for the closest semantically matching terms.

At step 1010, if there are common terms from steps 1006 and 1008, the terms are added to the dictionary 142 with high confidence.

At step 1012, if no common terms are found, user input may be obtained to pick or choose from suggested matches.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A method, comprising:
   operating one or more industrial devices at an industrial facility, wherein the industrial devices include a plurality of sensors;
   receiving a list of equipment tag names and descriptions, each of the equipment tag names being associated with one or more of the plurality of sensors associated with one or more industrial devices;
   obtaining a list of analytic tag names and descriptions, each of the analytic tag names being associated with one or more of the plurality of sensors that are associated with an analytic, the analytic being a computer program processing information from the one of the industrial machines;
   normalizing the equipment tag descriptions to create normalized equipment tag descriptions and normalizing the analytic tag descriptions to create normalized analytic tag descriptions;
   creating a first matrix of vectors that associates dictionary contents with aspects of the normalized equipment tag descriptions;
   creating a second matrix of vectors that associates dictionary contents with aspects of the normalized analytic tag descriptions;

wherein the first matrix comprises an m by n matrix, each row of the first matrix being a vector having an normalized equipment tag name, each column of the first matrix being a different term, and each entry in the first matrix represents whether the normalized equipment tag name has the term;

wherein the second matrix comprises an s by t matrix, each row of the second matrix being a vector having a normalized analytic tag name, each column of the second matrix being a different term, and each entry in the second matrix represents whether the analytic tag name has the term;

comparing each vector in the second matrix to each of the vectors in the first matrix to obtain first similarity measures as between each normalized analytic tag name from the second matrix and each normalized equipment tag name from the first matrix;

based upon the comparing, creating an output, the output being a ranked list of normalized equipment tag names ordered according to the first similarity measures;

determining whether to associate a normalized equipment tag name to an input of the analytic having the normalized analytic tag name based upon an analysis of the list;

wherein the output is utilized by an automated learning circuit to improve a mathematical model that is utilized in future mappings between analytic tag names and equipment tag names.

2. The method of claim 1, wherein the first matrix and the second matrix associate terms not in the dictionary with the tag names.

3. The method of claim 1, wherein the dictionary is part of a knowledge base, and wherein portions of the knowledge base are learning from the latest mapping and human input.

4. The method of claim 1, further comprising selectively updating the dictionary.

5. The method of claim 1, wherein normalizing the equipment tag descriptions comprises one of: automatically examining the syntax of the equipment tag names or accepting user input regarding the equipment tag names.

6. The method of claim 1, wherein normalizing the analytic tag descriptions comprises one of: automatically examining the syntax of the analytic tag names or accepting user input regarding the analytic tag names.

7. The method of claim 1, wherein the similarity measures obtained by the mapping are stored in a third matrix.

8. The method of claim 1, further comprising obtaining a second similarity measure between a parameter associated with each normalized analytic tag name and each normalized equipment tag name.

9. The method of claim 8, wherein the parameter relates to a measurement unit or one or more attributes of measurement associated with a tag.

10. The method of claim 9, further comprising multiplying or adding the similarity measure and the second similarity measure to obtain an overall similarity measure.

11. An apparatus, comprising:
one or more industrial devices at an industrial facility, wherein the industrial devices include a plurality of sensors;
an interface with an input and an output, the input configured to receive a list of equipment tag names and descriptions, each of the equipment tag names being associated with one of the plurality of sensors associated with an analytic, the analytic being a computer program processing information from the one of the industrial machines, the input configured to receive a list of analytic tag names and descriptions, each of the analytic tag names being associated with one or more of the plurality of sensors in the one or more industrial devices;
a database including a domain term dictionary;
a control circuit coupled to the interface and the database, the control circuit configured to normalize the equipment tag descriptions to create normalized equipment tag descriptions, and to normalize the analytic tag descriptions to create normalized analytic tag descriptions, the control circuit configured to create a first matrix of vectors that associates terms in a dictionary with aspects of the normalized equipment tag descriptions, and to create a second matrix of vectors that associates the terms in the dictionary with aspects of the normalized analytic tag descriptions, wherein the first matrix comprises an m by n matrix, each row of the first matrix being a vector having an normalized equipment tag name, each column of the first matrix being a different term, and each entry in the first matrix represents whether the normalized equipment tag name has the term;

wherein the second matrix comprises an s by t matrix, each row of the second matrix being a vector having a normalized analytic tag name, each column of the second matrix being a different term, and each entry in the second matrix represents whether the analytic tag name has the term;

wherein the control circuit is configured to compare each vector in the second matrix to each of the vectors in the first matrix to obtain first similarity measures as between each normalized analytic tag name from the second matrix and each normalized equipment tag name from the first matrix;

wherein the control circuit is configured to, based upon the comparing, create an output, the output being a ranked list of normalized equipment tag names ordered according to the first similarity measures;

wherein the control circuit is configured to determine whether to associate a normalized equipment tag name to an input of the analytic having the normalized analytic tag name based upon an analysis of the list;

wherein the output is utilized by an automated learning circuit to improve a mathematical model that is utilized in future mappings between analytic tag names and equipment tag names.

12. The apparatus of claim 11, wherein the first matrix and the second matrix also associate terms not in the dictionary with the tag names.

13. The apparatus of claim 11, wherein the control circuit is configured to selectively update the dictionary.

14. The apparatus of claim 11, wherein the normalized equipment tag descriptions are obtained by automatically examining the syntax of the equipment tag names or accepting user input regarding the equipment tag names.

15. The apparatus of claim 11, wherein the normalized analytic tag descriptions are obtained by automatically examining the syntax of the analytic tag names or accepting user input regarding the analytic tag names.

16. The apparatus of claim 11, wherein the control circuit is configured to obtain a second similarity measure between a parameter associated with each normalized analytic tag name and each normalized equipment tag name.

17. The apparatus of claim 16, wherein the parameter relates to a measurement unit or a tag description.

18. The apparatus of claim 16, wherein the control circuit is configured to multiply or add the similarity measure and the second similarity measure to obtain an overall similarity measure.

\* \* \* \* \*